(12) United States Patent
Le Leannec et al.

(10) Patent No.: US 8,630,343 B2
(45) Date of Patent: Jan. 14, 2014

(54) METHOD AND DEVICE FOR CODING DIGITAL IMAGES AND METHOD AND DEVICE FOR DECODING CODED DIGITAL IMAGES

(75) Inventors: Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1299 days.

(21) Appl. No.: 11/949,399

(22) Filed: Dec. 3, 2007

(65) Prior Publication Data

US 2008/0131011 A1 Jun. 5, 2008

(30) Foreign Application Priority Data

Dec. 4, 2006 (FR) ...................................... 06 55303

(51) Int. Cl.
*H04B 1/66* (2006.01)

(52) U.S. Cl.
USPC .................................................... 375/240.12

(58) Field of Classification Search
USPC .................. 375/240, 240.01, 240.03, 240.08, 375/240.12, 240.16, 240.27, 240.29
See application file for complete search history.

(56) References Cited

U.S. PATENT DOCUMENTS

| | | | | |
|---|---|---|---|---|
| 4,969,204 | A | 11/1990 | Melnychuck et al. | 382/56 |
| 6,501,860 | B1 | 12/2002 | Charrier et al. | 382/240 |
| 6,891,895 | B1 | 5/2005 | Onno et al. | 375/260 |
| 7,113,643 | B2 | 9/2006 | Le Leannec et al. | 382/235 |
| 7,190,838 | B2 | 3/2007 | Le Leannec et al. | 382/233 |
| 7,212,678 | B2 | 5/2007 | Brown et al. | 382/240 |
| 7,215,819 | B2 | 5/2007 | Onno et al. | 382/240 |
| 7,260,264 | B2 | 8/2007 | Guillou et al. | 382/232 |
| 7,281,033 | B2 | 10/2007 | Le Leannec et al. | 709/217 |
| 2002/0048319 | A1* | 4/2002 | Onno | 375/240 |
| 2003/0067627 | A1* | 4/2003 | Ishikawa et al. | 358/1.15 |
| 2004/0012820 | A1 | 1/2004 | Donescu et al. | 358/3.28 |
| 2004/0042486 | A1 | 3/2004 | Onno et al. | 370/466 |
| 2004/0068587 | A1 | 4/2004 | Le Leannec et al. | 709/247 |
| 2007/0014480 | A1* | 1/2007 | Sirohey et al. | 382/240 |
| 2007/0019721 | A1* | 1/2007 | Le Leannec et al. | 375/240.1 |
| 2007/0110163 | A1* | 5/2007 | Kodama | 375/240.21 |
| 2007/0127576 | A1 | 6/2007 | Henocq et al. | 375/240.16 |
| 2007/0140350 | A1* | 6/2007 | Sakazume et al. | 375/240.21 |
| 2007/0160133 | A1* | 7/2007 | Bao et al. | 375/240.1 |
| 2007/0171971 | A1* | 7/2007 | Francois et al. | 375/240.12 |
| 2007/0216699 | A1 | 9/2007 | Le Leannec et al. | 345/555 |
| 2007/0223033 | A1 | 9/2007 | Onno et al. | 358/1.15 |
| 2007/0286508 | A1 | 12/2007 | Le Leannec et al. | 382/240 |
| 2008/0025399 | A1 | 1/2008 | Le Leannec et al. | 375/240.16 |
| 2008/0049835 | A1* | 2/2008 | Kimoto | 375/240.11 |
| 2008/0075170 | A1 | 3/2008 | Henocq et al. | 375/240.16 |
| 2008/0130736 | A1 | 6/2008 | Onno et al. | 375/240.01 |

OTHER PUBLICATIONS

Clark, R. A.: "Digital Compression and Coding of Continuous-Tone still images: Extensions", ITU -T REC. T.84 (1996), pp. 1-80, May 1997.

Schwarz, H. et al.: "Constrained Inter-Layer Prediction for Single-Loop Decoding in Spatial Scalability", Image Processing 2005, IEEE International Conference on Genova, pp. 870-873, Sep. 11, 2005.

(Continued)

*Primary Examiner* — Hassan Phillips
*Assistant Examiner* — Ajay Cattungal
(74) *Attorney, Agent, or Firm* — Fitzpatrick, Cella, Harper & Scinto

(57) ABSTRACT

A method of coding digital images, wherein the method comprises a step of video coding of a plurality of successive images, the plurality of successive images corresponding to a plurality of versions of one and the same initial image at spatial resolutions different from that of the initial image.

25 Claims, 9 Drawing Sheets

(56) References Cited

OTHER PUBLICATIONS

Burt, P.J., et al.: "The Laplacian Pyramid as a Compact Image Code", IEEE Transactions on Communications, vol. COM-31, No. 4, pp. 532-540, Apr. 1, 1983.

Civanlar, M.R., et al."Efficient Multi-Resolution Multi-Stream Video Systems with Standard Codecs", Journal of VLSI Signal Processing Systems for Signal, Image, and Video Technology, vol. 17, No. 2/3, pp. 269-278, Nov. 1, 1997.

"Text of ISO/IEC 14496 10 Advanced Video Coding 3rd Edition", Joint Video Team (JVT) of ISO/IEC MPEG & ITU-T VCEG (ISO/IEC JTC1/SC29/WG 11 and ITU-T SG16 Q.6) (Jul. 2004).

"Joint Draft 6", Joint Video Team (JVT) of ISO/IEC MPEG & ITU-T VCEG (ISO/IEC JTC1/SC29/WG 11 and ITU-T SG16 Q.6), 19th JVT Meeting, Geneva Switzerland (Apr. 2006).

\* cited by examiner

METHOD AND DEVICE FOR CODING DIGITAL IMAGES AND METHOD AND DEVICE FOR DECODING CODED DIGITAL IMAGES

The invention relates to a method of coding digital images and decoding digital images thus coded.

Systems are known for interactive navigation in images having a multitude of successive resolution levels.

Such systems, such as those known by the names Zoomify, Zoomview and Kakadu, use multiresolution compression formats in which the spatial scale factor between two successive resolution levels is systematically equal to two.

A user of these systems can carry out forward zoom and backward zoom operations passing from one resolution level of an image to another resolution level that is lower or higher than it.

However, the forward zoom or backward zoom operation is possible only for dyadic resolution levels, which makes spatial navigation in an image at any intermediate resolution level impossible.

Moreover, the forward zoom and backward zoom operations in these systems require processing subsequent to the image decoding operations before proceeding with the display of these images.

More particularly, subsampling or supersampling operations subsequent to the image decompression operations are in fact necessary in order to be able to navigate interactively in these multi-resolution images for any intermediate resolution levels.

The present invention makes provision for remedying at least one of the drawbacks presented above by proposing a method of coding digital images, characterized in that the method comprises a step of video coding of a plurality of successive images, the plurality of successive images corresponding to a plurality of versions of the same initial image at spatial resolutions different from that of the original image.

According to the invention a video coding is performed along the axis of the spatial resolutions in a set of images representing a given fixed image at different spatial resolutions while video coding is traditionally applied along the time axis. It should be noted that different versions of the initial image are not necessarily ordered.

Non-ordering allows rapid access to certain particular resolution levels, which may prove advantageous with certain types of application.

The use of video coding involves a prediction step based on motion compensation between various resolution levels of the same image.

In this way a plurality of successive compressed images are obtained representing the same image at different spatial resolution levels, the number of which is not limited.

The initial image is compressed in a format having a multitude of not necessarily dyadic resolutions.

This is because, by virtue of the invention, it is the user who can choose, when the compressed image is generated, the scale factor between the various resolution levels, thus offering flexibility of use of the method.

When the spatial resolutions are ordered (successive spatial resolution levels) the invention makes it possible, for example, to produce a compressed image file with increasing resolutions.

The ordering of the various spatial resolutions is performed in an appropriate manner according to the aim pursued.

Thus the ordering may be performed for the purpose of optimizing the rate/distortion ratio.

Ordering may also be performed in order to achieve very precise functionalities required by a user such as for example navigation within different resolution levels.

The invention is particularly simple since it is not necessary to carry out any processing after decoding in order to be able to navigate interactively amongst the multitude of ordered spatial resolution levels and, more particularly, in order to be able to perform forward and backward zoom operations continuously between different resolution levels.

Moreover, an existing video coder, possibly in conformity with a digital video compression standard, can be used to generate simply a compressed file facilitating interactive navigation.

It is thus possible to implement the invention easily in existing systems.

According to one characteristic, the spatial resolutions of the plurality of successive images are lower than the resolution of the initial image.

In this way, from the initial image, intermediate images of good quality are obtained.

Moreover, choosing one or more spatial resolutions higher than that of the initial image makes it possible to perform operations of enlargement of the latter in order to obtain expanded versions.

According to one characteristic, the initial image having an initial spatial size, prior to the video coding step, the method comprises a step of increasing the edges of each of the images of the plurality of successive images, these so-called useful images having a size less than that of the image of maximum size obtained from this plurality of images, each image with a size thus increased having the same spatial size as that of the image of maximum size.

In the particular case where the spatial resolutions of the plurality of successive images are lower than the resolution of the initial image, each image with a size thus increased then has the initial spatial size of the initial image.

The operation of increasing the size of the images of smaller sizes thus consists of the creation of a border or frame around the image.

The advantage of this characteristic is that it makes it possible to supply to the video coder a sequence of images which all have the same dimensions and therefore to avoid modifying the video coder used for implementing the invention. This is because a video coder generally works on sequences that have images with the same dimensions.

According to one characteristic, the method comprises a prior step of obtaining the plurality of successive images, from the initial image.

Thus the starting point is the original image at its full resolution in order to create the successive images that are to be coded.

Next a video coding of the images thus created is performed.

The multitude of different resolution levels obtained are, for example, selected by a user, who specifies the scale factor between the levels.

To do this, he chooses, for example, the lowest resolution of the initial image, the maximum resolution required and the number of intermediate resolution levels required.

According to one characteristic, the method comprises a step of inserting header data in the signal comprising the plurality of coded images, the header data comprising the size of the image with the lowest resolution and the number of resolution levels contained in the signal.

According to an alternative characteristic, the method comprises a step of inserting header data in the signal comprising the plurality of coded images, the header data comprising, for each image of increased size, the size of the useful image.

By disposing this information in the header data the operations of calculating the image size at the decoder are thus reduced, which decreases its complexity.

It should be noted that a choice is made between the above two alternatives according to the aim sought: reducing the size of the compressed file or reducing the complexity of the decoder.

According to another characteristic, the header data comprise, for each image of increased size, the position of the useful image in the image of increased size.

Thus it is possible to find the useful image whatever its position in the augmented image. It should be noted however that, if each image is centered or, in more general terms, placed at a known fixed position of the decoder (for example at top left), this position information is not necessary.

According to one characteristic, the step of obtaining the images is a step of subsampling of the initial image.

Performing a subsampling of the original image in order to generate each reduced image supplies reduced images of better quality than if the successive reduced images were derived from one another.

By also performing a filtering of the images thus subsampled, for example a low-pass filtering, the quality of these images is improved.

According to one characteristic, the video coding of the plurality of images at successive resolutions lower than that of the initial image comprises a step of video coding of the image of lowest resolution as for an INTRA image of a video sequence.

The advantage of this characteristic is in particular to allow rapid access to the low-resolution representation of the image in question. This representation, referred to as a thumbnail ("thumbnail" in English terminology), generally constitutes the pre-display version of a multiresolution image in an interactive navigation application. The second advantage of this characteristic is related to the compression performance that it procures. This is because the lowest-resolution version is the least expensive for coding in INTRA. The images of larger size can then be predicted by temporal prediction techniques known in video coding.

According to one characteristic, the video coding also comprises, for at least some of the successive images with a higher resolution than that of the lowest-resolution image, a step of predictive video coding of each of these images.

The advantage of this characteristic lies in the fact that the redundancies existing between the various images in the sequence to be coded are exploited by temporal prediction techniques known in the field of video coding, for the purpose of supplying a compressed representation of the multiresolution pyramid in question.

According to one characteristic, the method comprises a step of coding at least one permutation image and a step of inserting said at least one coded permutation image amongst the plurality of successive coded images.

One or more permutation images thus coded and inserted in the coded file make it possible to perform a backward zoom operation in the coded multiresolution image.

According to one characteristic, the method also comprises a step of hierarchical video coding of the plurality of successive images.

The video coding of the plurality of successive images at different spatial resolutions associated with the hierarchical video coding of this same plurality of images enables the user to rapidly access spatial resolutions of his choice without necessarily having to decode all the images with a lower spatial resolution.

Another object of the invention is a method of decoding at least some of a plurality of successive digital images coded by video coding, characterized in that the plurality of successive images corresponds to a plurality of versions of one and the same initial image at spatial resolutions different from that of the initial image, the method comprising a step of video decoding of at least some of this plurality of coded images.

Thus, after having performed the decoding of all or some of the plurality of coded images, it is not necessary to proceed with a post-processing step in order to be able to perform interactive navigation operations, in particular forward and backward zoom continuously on the multiresolution image.

If the existing video coder, possibly in conformity with a digital video compression standard, has been used for the coding of the multiresolution image, then an existing video decoder, possibly in conformity with a digital video compression standard, can be used for proceeding with the decoding operations.

Graphical operations of forward zoom and backward zoom on the multiresolution image thus decompressed are then very easy to perform in an apparatus having available a standard video decoder.

According to one characteristic, the decoding method comprises the following steps:
  determining, among the plurality of successive coded images, a coded image having a resolution corresponding to a spatial size selected by a user,
  video decoding of the successive coded images from the coded image with the lowest resolution as far as the coded image thus determined.

Thus a user chooses a spatial resolution level among a multitude of possible resolution levels and a video decoding of the successive images necessary is performed in order to display the image in the required resolution.

According to one characteristic, the spatial resolutions are ordered.

According to one characteristic, the spatial resolutions are lower than that of the initial image.

According to one characteristic, the method comprises a step of reading header data of the signal comprising the plurality of coded images, the header data comprising the size of the image with the lowest resolution and the number of resolution levels contained in the signal.

According to one characteristic, each of the coded images is an image whose size has been increased with respect to the smaller size of the useful image in order to achieve, for each image, the maximum size of the image obtained from the plurality of successive images, the method comprising a step of reading header data of the signal comprising the plurality of coded images, the header data comprising, for each coded image, the size of the useful image.

According to one characteristic, the header data comprise, for each coded image, the position of the useful image in the image of increased size.

According to one characteristic, the plurality of successive images also having undergone hierarchical video coding, the method comprises a step of hierarchical video decoding of at least some of the plurality of successive images thus coded.

Correspondingly, another object of the invention is a device for coding digital images, characterized in that the device comprises means of video coding of a plurality of successive images, the plurality of successive images corresponding to a plurality of versions of one and the same initial image at spatial resolutions different from that of the initial image.

Another object of the invention is a device for decoding at least some of a plurality of successive digital images coded by video coding, characterized in that the plurality of successive images correspond to a plurality of versions of one and the same initial image at spatial resolutions different from that of the initial image, the device comprising means of video decoding of at least some of this plurality of coded images.

According to one characteristic, the decoding device comprises means of determining, among a plurality of successive coded images, a coded image having a resolution corresponding to a spatial size selected by a user, the video decoding means being able to perform the video decoding of the successive coded images from the coded image with the lowest resolution as far as the coded image thus determined.

The invention also relates to a computer program that can be loaded into a computer system, said program containing instructions for implementing the coding method briefly disclosed above and/or for implementing the decoding method briefly disclosed above, when this program is loaded into and executed by a computer system.

Other characteristics and advantages will emerge during the following description, given solely by way of non-limiting example and made with reference to the accompanying drawings, in which.

Figure 1:
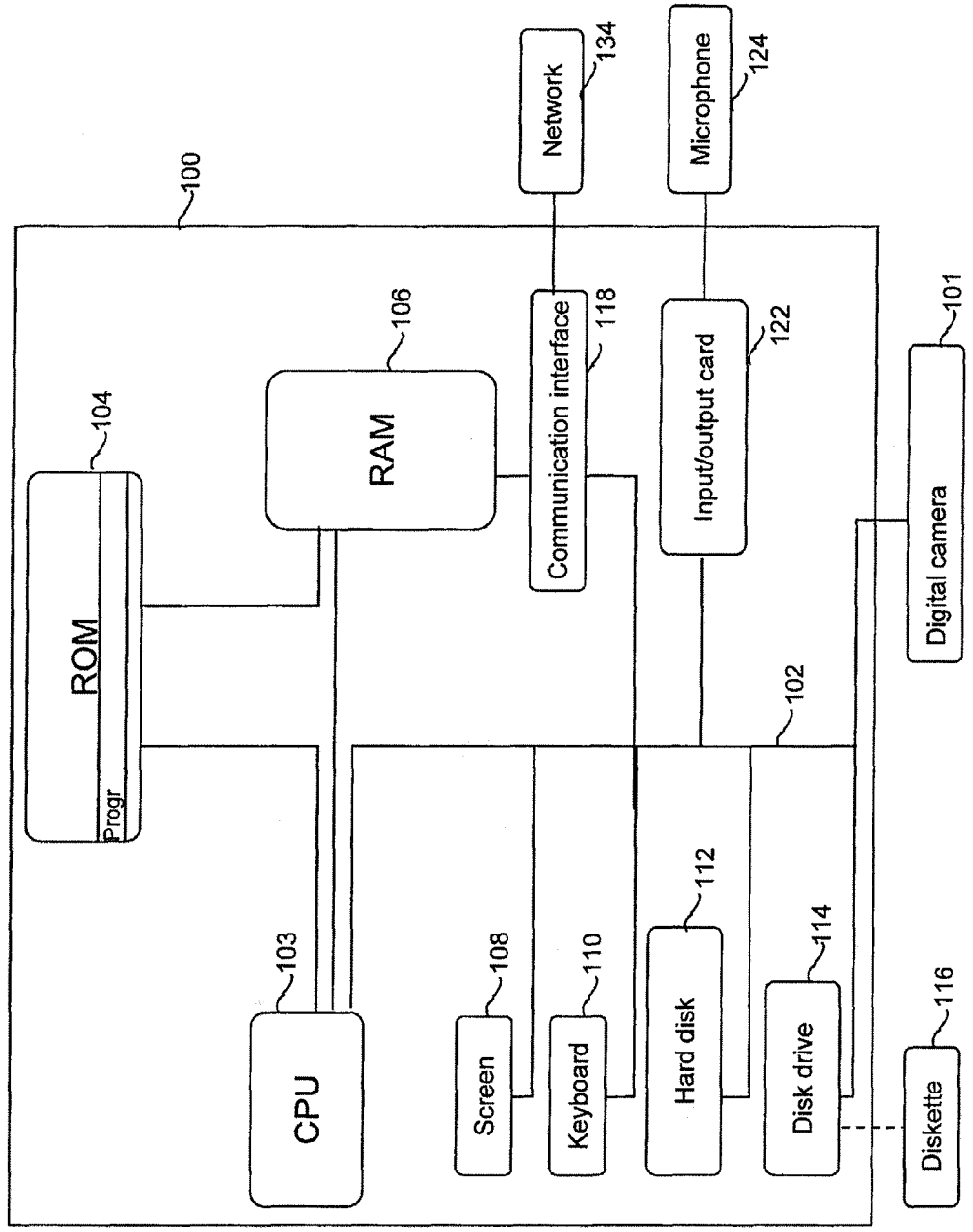
FIG. 1 illustrates schematically a device including the means of implementing the invention.

FIG. 1 illustrates a particular embodiment of the device that is the object of the present invention, coder and/or decoder 100 and various peripherals adapted to implement each aspect of the present invention. In the embodiment illustrated in FIG. 1, the device 100 is a microcomputer of a known type connected, in the case of the coder, by means of a graphics card to an image acquisition or storage means 101, for example a digital camera or a scanner, adapted to supply information on images to be coded.

The device 100 comprises a communication interface 118 connected to a network 134 able to transmit, as an input, digital data to be coded or decoded and, as an output, data coded or decoded by the device. The device 100 also comprises a storage means 112, for example a hard disk, and a drive 114 for a diskette 116. The diskette 116 and the storage means 112 can contain data to be coded or decoded, coded or decoded data and a computer program adapted to implement the coding or decoding method that is the object of the present invention.

According to a variant, the program enabling the device to implement the present invention is stored in read-only memory ROM (the acronym for "read only memory", meaning non-rewritable memory) 104. According to another variant, the program is received by means of the communication network 134 before being stored.

The device 100 is, optionally, connected to a microphone 124 by means of an input/output card 122. This same device 100 has a screen 108 for displaying the data to be coded or that are decoded or serving as an interface with the user in order to parameterize certain execution modes of the device 100, by means of a keyboard 110 and/or a mouse for example.

A central unit CPU (the acronym for "central processing unit") 103 executes the instructions of the computer program and programs necessary for its functioning, for example an operating system. When the device 100 is powered up, the programs stored in non-volatile memory, for example the read-only memory 104, the hard disk 112 or the diskette 116, are transferred into a random access memory RAM (the acronym for "random access memory", meaning random access memory) 106 which will then contain the executable code of the program that is the object of the present invention as well as registers for storing the variables necessary for its use.

Naturally the diskette 116 can be replaced by any removable information medium, such as a compact disk, key or memory card. In more general terms, an information storage means which can be read by a computer or by a microprocessor, integrated or not into the device, possibly removable, stores a program that is the object of the present invention. A communication bus 102 affords communication between the various elements included in the device 100 or connected to it. The representation, at FIG. 1, of the bus 102 is not limiting and in particular the central unit 103 is able to communicate instructions to any elements of the device 100 directly or by means of another element of the device 100.

The device described here and in particular the central unit 103, are able to implement all or some of the processing operations described with regard to the following figures for implementing each method that is the object of the present invention and to form each device that is the object of the present invention.

Figure 2:
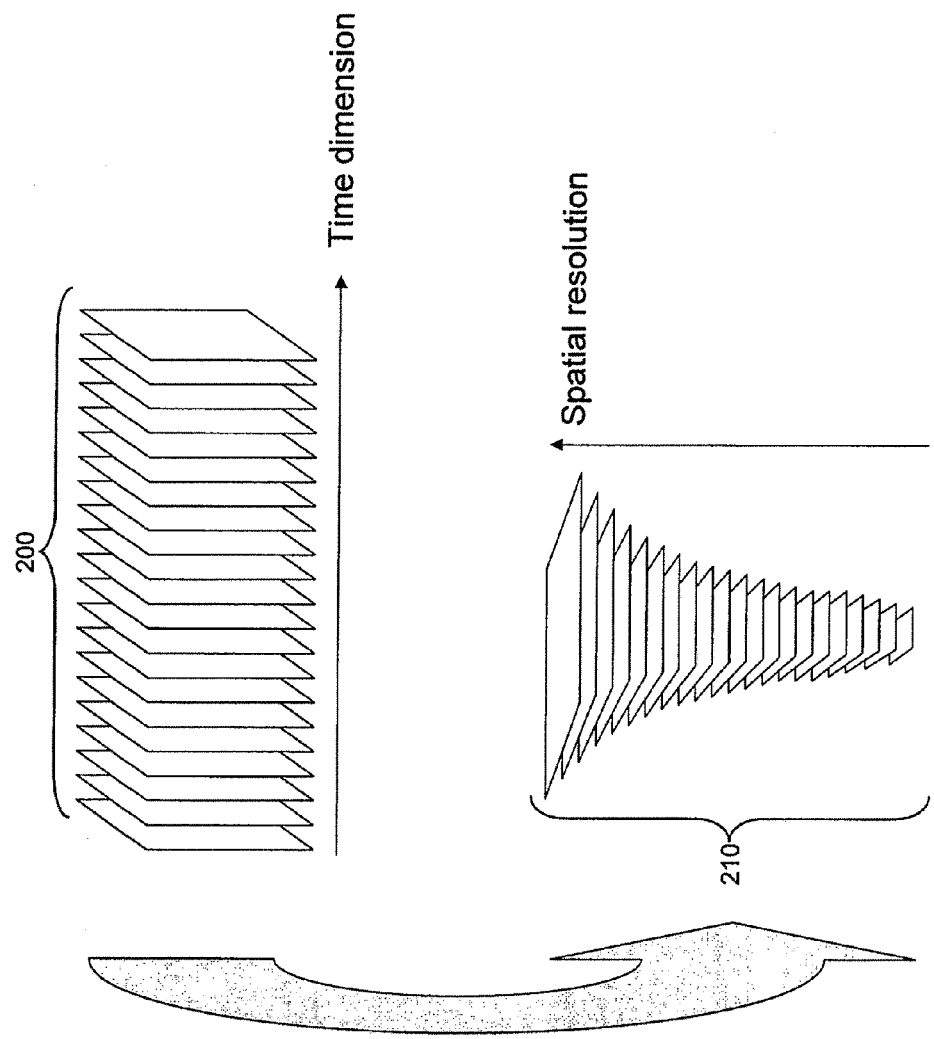
FIG. 2 illustrates schematically the spatial multiresolution coding according to the invention.

FIG. 2 illustrates schematically the principle of the invention.

The top part of this figure shows a series of images 200 constituting a video sequence that unfolds along a time axis (time dimension).

In a known fashion, a video coder applied to the video sequence 200 exploits in particular the redundancies existing within this sequence along the time dimension, in order to obtain good compression performance.

The bottom part of FIG. 2 illustrates a series of images 210 depicting one and the same original image that has been reduced at various spatial resolution levels ordered from the lowest resolution to the highest resolution (multiresolution pyramidal representation).

This plurality of non-limiting resolution levels is obtained from the original image, for example by means of a subsampling operation and then by a possible low-pass filtering operation in order to improve the quality of the reduced images.

The invention makes provision for performing a video coding in multiresolution pyramidal representation of a given fixed image like the one illustrated at the bottom part of FIG. 2.

It should be noted that, in this example, the spatial resolutions of the various images are ordered according to increasing resolutions. However, the invention also applies when the images obtained from the initial image are not ordered.

Figure 3:
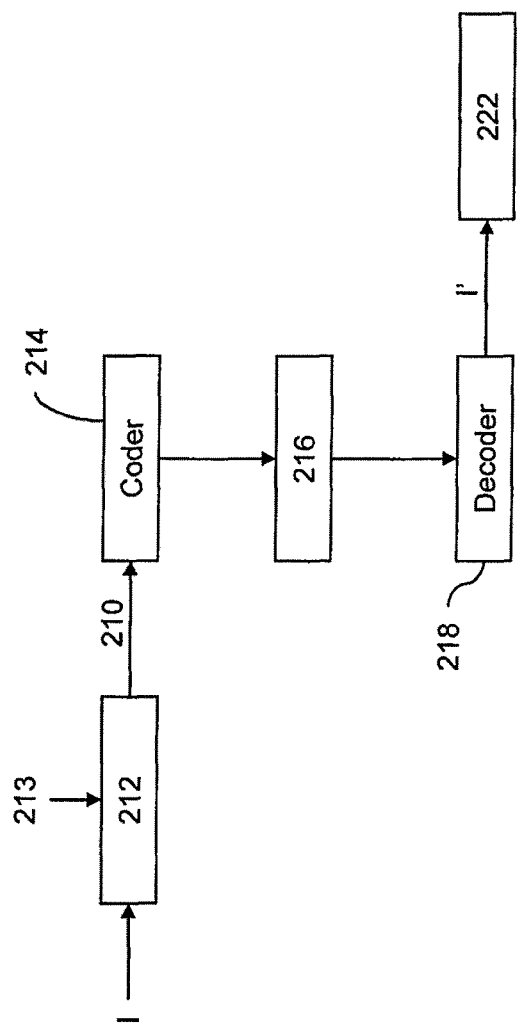
FIG. 3 illustrates schematically an example embodiment of the various functional blocks used according to the invention.

FIG. 3 depicts schematically the coding and decoding of images according to an example embodiment of the invention.

An initial image I in full resolution is supplied as an input to a processing unit 212, which also receives input data 213, for example supplied by a user.

These data supplied, for example, with a user request indicate the specificities required by the user, namely, for example, the number of resolutions for the plurality of images that will be generated as well as possibly the size of the image with the lowest resolution.

It should be noted that these two parameters unambiguously define the multiresolution pyramid that will be created.

By using these two parameters the scale factor is determined, which is for example the additive ratio linking, in terms of dimensions, two successive images of this multiresolution pyramid.

There are obtained at the output of the processing unit 212 a plurality of successive images 210 corresponding to a plurality of versions of the image I at successive resolutions lower than those of this image I.

The series of images 210 at multiple resolution levels thus generated is supplied as an input to a video coder 214.

In this coder, the series of images generated at multiple resolution levels is compressed by known video compression techniques.

These include, in particular, estimation and motion compensation steps that are applied to the blocks of pixels of the various images in the series of multiresolution images to be compressed.

The plurality of images thus coded by video coding are transmitted by means of a transmission means 216 (for example a communication network) to a video decoder 218.

This decoder also receives input data, from the image display application, that define one of the images in the plurality of coded images, or the dimensions at which the user wishes to see the image displayed.

For example, the user can select the spatial size of an image or its resolution.

An appropriate video decoding of all or some of the plurality of coded images is thus performed and generates a series of decoded images ranging from the image with the lowest resolution to the image whose resolution (or size) corresponds to that requested by the user.

This last image I' requested by the user is displayed by a unit 222.

Figure 4:
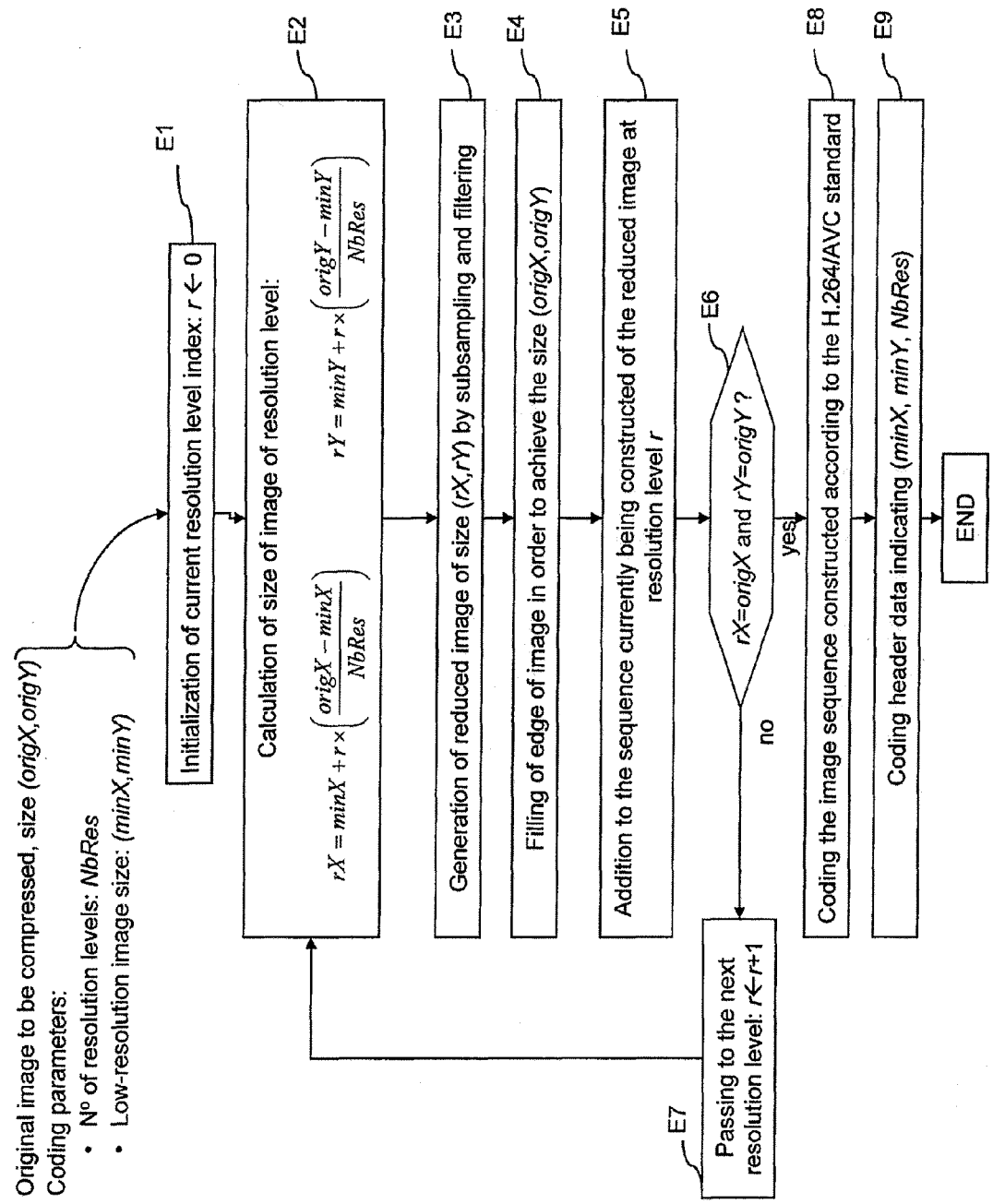
FIG. 4 illustrates schematically a coding algorithm according to an example embodiment of the invention.

FIG. 4 depicts a general multiresolution image coding algorithm according to an example embodiment of the invention.

The algorithm uses the following input data:
the original image I to be compressed with its size (origX, origY),
the coding parameters, namely the number of spatial resolution levels (NbRes) that the compressed signal at the output of the coder will have to contain, this number being specified by the user, as well as the size of the image with the lowest resolution (minX, minY) indicated by the user and which corresponds to the smallest reduced image version (also referred to as a "thumbnail" in English terminology) of the original image I to be coded.

By way of variant, the minimum size and the additive factors (in terms of width and height) linking two successive resolution levels are indicated at the input of the algorithm.

According to another variant, multiplying factors between successive resolution levels are considered.

According to yet another variant, the sizes of the relevant resolution levels are explicitly specified, if a not necessarily regular progression is required.

It should be noted that selection by the user is one method of implementing the invention. Alternatively, the number of resolutions can be predetermined according to the application sought.

The algorithm comprises a first step E1 of initializing the first resolution level r=0 (the lowest resolution of the image) to be processed by the algorithm.

At the first resolution level r=0, the reduced image has a corresponding size defined by the parameters rX, rY, which are determined at the following step E2 by the mathematical formulae illustrated in FIG. 4.

For the first resolution level (r=0) the size of the reduced image in question is that of the image with the lowest resolution defined by the values minX and minY.

During the following step E3, action is taken in a known fashion to generate, by conventional operations of subsampling and low-pass filtering, a reduced image of width rX and height rY from the original image I.

The following step E4 consists of conferring on the reduced image the size of the original image (origX, origY).

This is because the video coder 214 in FIG. 3 is adapted to function only with images of identical dimensions.

Thus the reduced-size image is supplemented by adding (this addition is known in English terminology by the term "padding") at the periphery thereof, for example black pixels.

In this way the edges of the image are filled in in order to attain the size of the original image I.

The image thus reduced and completed at the edges is then added (step E5) to the plurality of images currently being produced and which are intended to represent a multi-resolution pyramid of the original image.

For the last resolution level (r=NbRes) the reduced image that has just been processed is the first in this sequence of images and there is therefore no pixel to be added to it at the periphery.

During the following step E6 a test is performed in order to determine whether the size of the reduced image that has just been processed is that of the original image I.

If not (such is the case when the first resolution level r=0 is processed), this step is followed by a step E7 of incrementing the current resolution level by one unit. The aforementioned steps E2 to E5 are then once again executed for the following resolution level (r=1).

For this new level, the size of the reduced image at this resolution level is calculated (E2), and then generated from the image I (E3), supplemented (E4) and added to the sequence currently being produced and which already contains the reduced image version of the lowest resolution level.

Returning to step E6, when all the spatial resolution levels fixed in advance have been processed and a succession of images has thus been constructed at multiple resolution levels lower than the maximum resolution level of the image I, a video coding is carried out along the axis of the spatial resolutions of this sequence of images at step E8.

In the example embodiment, the video coder 214 in FIG. 3 performs a coding according to the H.264/AVC video coding standard.

Naturally other types of video coding can be used without departing from the scope of the invention.

The algorithm in FIG. 4 thus generates a plurality of successive coded images that constitute a compressed bitstream (compressed file) compatible with the video coding standard used.

Next, during a step E9, header data are added in the header of the signal comprising the various coded images in the coded sequence. These data indicate firstly the size of the image in the sequence representing the original image at the lowest resolution level and secondly the total number of resolution levels contained in the compressed signal. For example, in the case of the use of the H264/AVC video standard, these header data can be coded in a message of the SEI type (known in English terminology by the term "Supplemental Enhancement Information") that is defined specifically for this purpose.

It should be noted that, in the file produced by virtue of the algorithm in FIG. 4 the various successive spatial resolutions of the initial image I are classified by increasing order from the lowest resolution as far as the maximum resolution, as illustrated moreover by the bottom part of FIG. 2.

It should be noted that the calculation of the sizes of various versions of the image currently being coded (step E2) involve an affine progression of sizes of the various intermediate resolution levels selected by the user, between the original image I of maximum size and the lowest-resolution image.

However, instead of using an affine function for defining the various intermediate spatial resolutions, a constant multiplying factor not necessarily equal to 2 can be applied between two successive resolution levels of the image.

According to yet another variant, it is possible to use a series of values of dimensions explicitly specified at the input of the algorithm in FIG. 2 for each resolution level.

Figure 5:
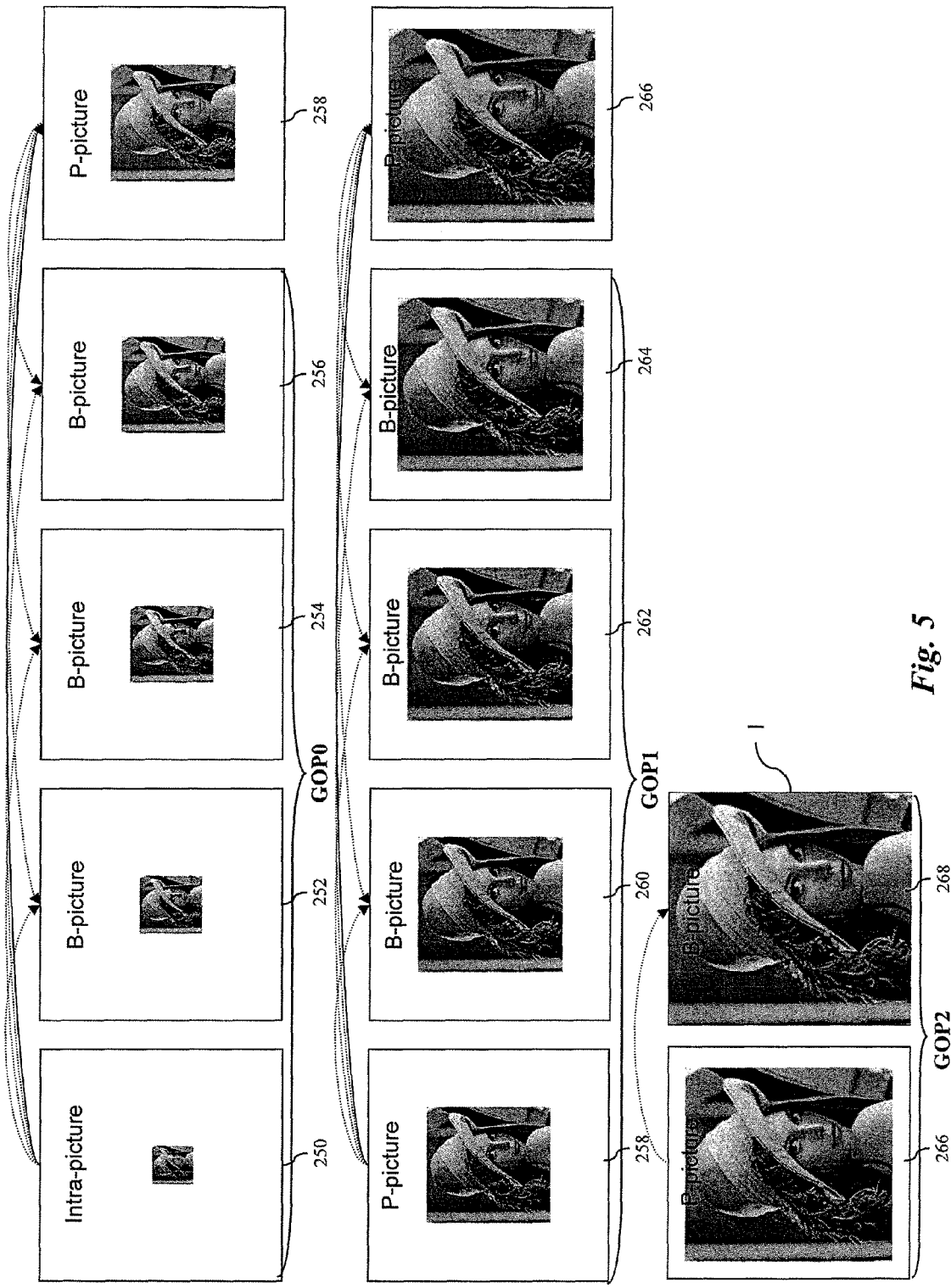
FIG. 5 illustrates schematically a plurality of successive coded images according to an example embodiment of the invention.

FIG. 5 depicts an example of a video coding structure applied to a sequence of images representing a spatial multi-resolution pyramid of one and the same initial image I (image I in FIG. 3).

The plurality of images depicted in FIG. 5 is obtained by applying successive steps E3 to E5 of the algorithm of the FIG. 4 for all the resolution levels defined by the user.

The first image 250 amongst this plurality of successive images corresponds to the lowest-resolution image and a coding in INTRA is applied to this image.

A group image structure or GOP (known in English terminology by the term "Group Of Pictures") of size 4 is, for example, defined.

The first group GOP0 is defined by the following successive images 250, 252, 254, 256, the second group GOP1 by the images 258, 260, 262 and 264 and the last group GOP2 by the images 266 and 268.

It should be noted that the first image in each group except for the first group is a P-type image (images 258 and 266), that is to say this image is predicted from one or more other type I or P images.

This prediction is symbolized by the arrows situated above the images depicted in FIG. 5.

It should be noted that the images 258 and 266 are each duplicated on two different lines in the figure for reasons of clarity of presentation of the prediction.

In addition, the images in each group following the first type P image are type B images (images 260 and 268), that is to say they are predicted by motion estimation and motion compensation bidirectionally by means of the past and future reference image or images.

Such a predictive video coding in accordance with the H.264/AVC standard is more particularly detailed in the following document: "text of ISO/IEC 14496 10 Advanced Video Coding 3$^{rd}$ Edition", ISO/IEC JTC1/SC29/WG 11 N6540, Joint Video Team (JVT) of ISO/IEC MPEG & ITU-T VCEG, July 2004, Redmond USA.

It should be noted that in FIG. 5 all the images in the sequence have the same size or dimension (height and width in number of pixels), following the filling of each of these images at step E4 in FIG. 4.

Figure 6:
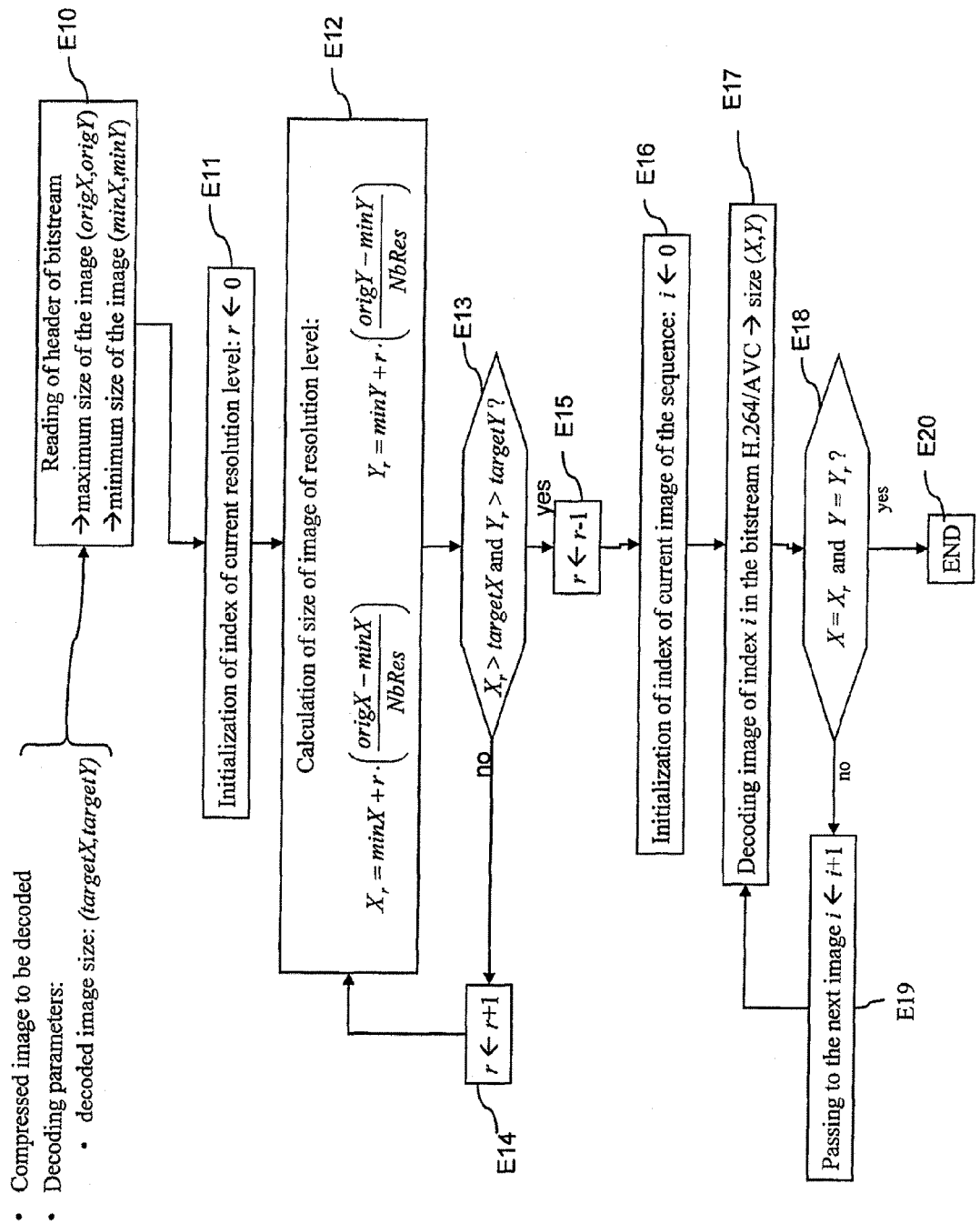
FIG. 6 illustrates schematically a decoding algorithm according to an example embodiment of the invention.

FIG. 6 illustrates an algorithm for decoding a multi-resolution image according to the invention.

The data supplied at the input of the algorithm in FIG. 6 are as follows:
  the multi-resolution image that was compressed by execution of the algorithm in FIG. 4 and that must be decompressed,
  the decoding parameters that are for example indicated by the image display application and which comprise in particular the spatial size (width and height) of the decompressed image that the user requires.

This size is for example defined by parameters targetX and targetY.

According to a variant, the user can indicate the resolution rather than the size of the required image. Thus the user specifies a zoom factor via the graphical interface of the application for navigating in images. Such a zoom factor can then be supplied to the decoder, which derives therefrom the image of the multi-resolution pyramid that it is necessary to decode and restore to the graphical interface.

The algorithm in FIG. 6 begins with a step E10 during which the header data that are contained in the compressed bitstream representing the compressed multi-resolution image are decoded and read.

The reading of these header data supplies in particular the dimensions of the image I at its maximum resolution level (origX, origY), as well as the dimensions of the image at its minimum resolution level (minX, minY) and the total number of resolution levels.

In the remainder of the algorithm there is determined, among the plurality of successive coded images, the one that corresponds best to the information supplied by the user, in particular the dimensions targetX and targetY of the image required.

To do this, the successive resolution levels of the compressed multi-resolution image are examined until the one selected by the user is found.

The starting point is thus step E11, which provides the initialization of the current resolution level to the minimum value r=0.

There is next calculated, at step E12, the size of the image corresponding to the resolution level in question, in an identical fashion to that performed at step E2 in FIG. 4.

This calculation is necessary when the dimensions of the image depicted at the various spatial resolution levels contained in the compressed signal are not coded as header data at step E9 in FIG. 4.

A test is then performed at the following step E13 in order to determine whether the size of the image that has just been calculated is greater than the dimensions required by the user (targetX, targetY).

If not, step E13 is followed by step E14, which makes provision for incrementing the current resolution level by one unit in order to perform the calculation of the size of the following image (image of resolution level r=1 in the example in question) at the already described step E12.

This loop is performed until the dimensions of the image of the current resolution level that have just been determined at step E12 are greater than the required dimension (targetX, targetY) and therefore until the result of the test of step E13 is positive.

In this case, step E13 is followed by step E15 during which the current resolution level is decremented by one unit.

This is because the resolution level sought and which corresponds to the size required by the user is not the one for which the size of the image is greater than the required dimensions but the previous one.

Alternatively, it is possible to avoid the iterative loop described above and to directly calculate the index of the resolution level to which the sizes targetX and targetY relate in the following fashion:

$$r = \max\left(\left\lfloor\frac{\text{targ and } X - \min X}{\text{orig}X - \min X} \times NbRes\right\rfloor, \left\lfloor\frac{\text{targ and } Y - \min Y}{\text{orig}Y - \min Y} \times NbRes\right\rfloor\right).$$

The dimensions thus determined of the current resolution level r defined at step E15 are denoted Xr and Yr.

During the following step E16 the current image in the sequence is initialized with a view to decoding (image index i=0).

During the following steps, the plurality of successive coded images are run through, from the image with the lowest resolution as far as the coded image corresponding to the above-mentioned resolution level r.

Thus, more particularly, step E17 makes provision for performing a video decoding in accordance with the H.264/AVC standard corresponding to the coding performed at step E8 in FIG. 4.

The image of index i having been thus decoded, the following step E18 makes provision for performing a test on the values of the dimensions of the image of current resolution level in question with respect to the values Xr and Yr.

As long as the values are not equal, step E18 is followed by step E19, which makes provision for incrementing by one unit the image index among the plurality of successive images in the compressed file in order to proceed with the decoding of the following image of higher resolution.

This loop is performed as long as equality is not found at step E18.

As soon as the dimensions of the current image i that has just been decoded correspond to those of the abovementioned resolution level r then the last decoded image represents the reconstructed version of the desired image I' of FIG. 3. This image is therefore in a position to be displayed.

The algorithm of FIG. 6 is then ended at step E20.

It should be noted that embodiment illustrated by the algorithms in FIGS. 4 and 6 uses a predetermined algorithm that is common to the decoder 214 and decoder 218 in FIG. 3. This algorithm makes it possible to determine the spatial dimensions or sizes of the successive versions of the multi-resolution image currently being coded and decoded at each resolution level.

According to a variant embodiment, step E12 of calculating the size of the image of current resolution level is omitted from the decoding algorithm in FIG. 6.

In this variant, the coder 214 inserts the actual size of the image (the size of the useful image) calculated at step E2 in FIG. 4 in the header data of the bitstream compressed at step E9.

Thus, for each image with a size increased by the filling step E4, information is available on the size of the useful image.

The decoder 218 can, after reception of the coded image signal, read the header after any decoding in order to find this information.

The operations performed at the decoder are thus simplified.

It should be noted that the information on the sizes of the image of the various successive resolution levels of the compressed multi-resolution image makes it possible, at the decoder, to determine, for each resolution level examined (steps E13 and E14), the image pixels added at the periphery of the image (step E4 in FIG. 4) with a view to eliminating them before display.

It should be noted that the insertion of such information in the compressed file can be made by generating specific header fields in the bitstream in accordance with the H.264 standard as indicated at step E9 in FIG. 4.

According to another variant, the image representing the various resolution levels lower than the maximum resolution level of image I are such that the zone added around the "useful" or "effective" part of the image in question is not centered with respect to the center of the image as is the case on the images 250 to 268 in FIG. 5.

According to this variant, particular header data are added by the coder in the compressed bitstream in order to indicate, opposite each image of intermediate resolution level, the position of the "useful" or "effective" image in the image of increased size.

This position corresponds for example to the coordinates of the top left-hand point of the "useful" image (for example the coordinates of the top left-hand point of the "useful" image with respect to the augmented image 252 in FIG. 5).

It should be noted that this variant can be combined with the previous variant, in which the compressed bitstream also comprises header data specifying the size of each useful image of intermediate resolution level.

Figure 7:
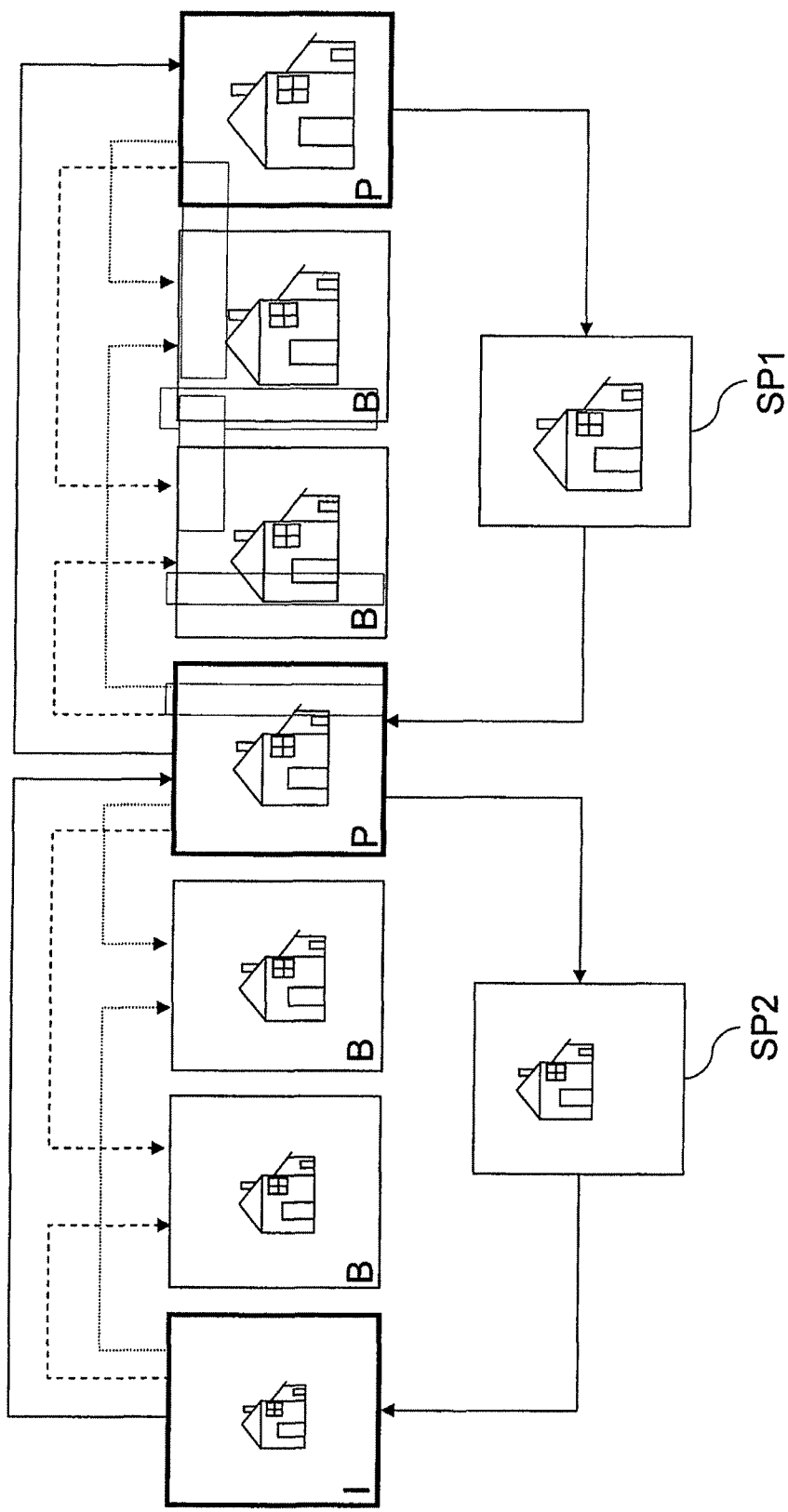
FIG. 7 illustrates a variant embodiment of the invention providing a rapid backward zoom functionality in a compressed multiresolution fixed image.

FIG. 7 depicts a succession of versions of different spatial resolutions of a given image obtained in accordance with the principle of the invention disclosed above.

In this example embodiment, the various spatial resolutions of the plurality of images are classified from the lowest resolution (image I on the left of the figure) to the highest resolution (image P on the right of the figure).

This plurality of images, consisting of the image I, two type B images, one type P image, two B-images and finally a type P image, is particularly adapted to progressive forward zoom operations but proves to be much less suited to backward zoom.

In this regard, permutation images of the SP type (known in English terminology by the term "Switching Pictures") that are defined in the standard disclosed in the following document "Text of ISO/IEC 14496 10 Advanced Video Coding $3^{rd}$ Edition", ISO/IEC JTC1/SC29/WG11 N6540, Joint Video Team (JVT) of ISO/IEC MPEG & ITU-T VCEG, July 2004, Redmond, USA, were coded and inserted in the compressed multi-resolution image defined above, for the purpose of allowing the rapid performance of a backward zoom operation in the compressed image.

This functionality of rapid backward return of the SP images in a compressed video sequence is known from the compression standard H.264/AVC.

This functionality is applied here by replacing the temporal dimension with the spatial resolution axis by virtue of the presence of the SP images.

Thus, starting from the P image on the right of FIG. 7, using the image SP1, the P image in the middle of the image sequence in FIG. 7 is found.

By virtue of these two P images, the B images framed by the latter is easily found by simple prediction.

Likewise, from the P image in the middle of the sequence in FIG. 7, using the intermediate image SP2, the I image on the left of FIG. 7 is found.

There also, the B images framed by the I image and the P image are easily deducible from the latter by simple prediction.

The functionality introduced by the presence of the SP-type images thus makes it possible to pass rapidly from one resolution level to a lower resolution level remote from the first level.

This also makes it possible to more easily manage the memory space available since, by means of a few SP images the majority of the other images in the sequence of multi-resolution images are easily found, or even all of them.

Figure 8:
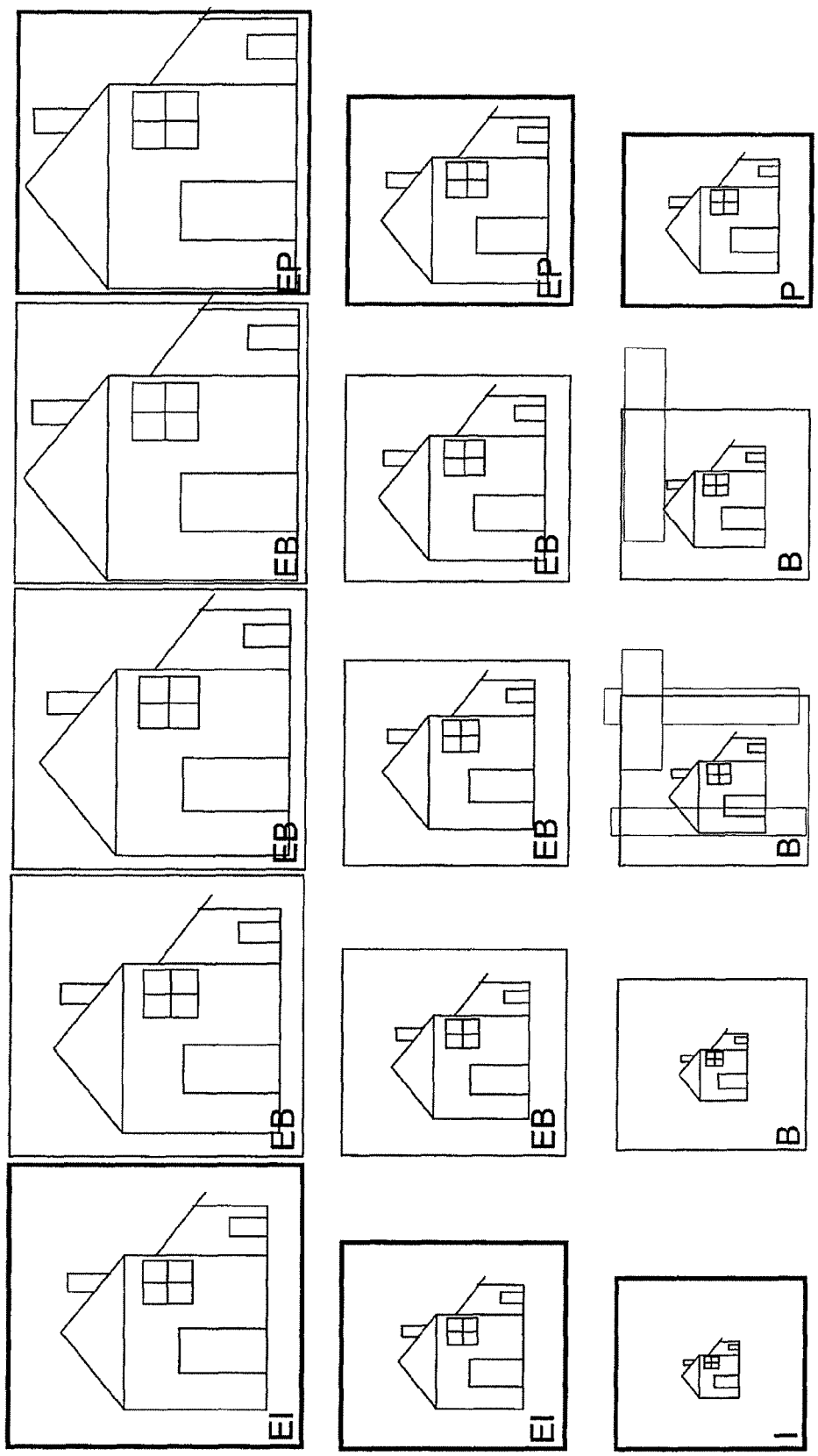
FIG. 8 illustrates schematically another variant embodiment of the invention implementing the SVC hierarchical video coding.
Figure 9:
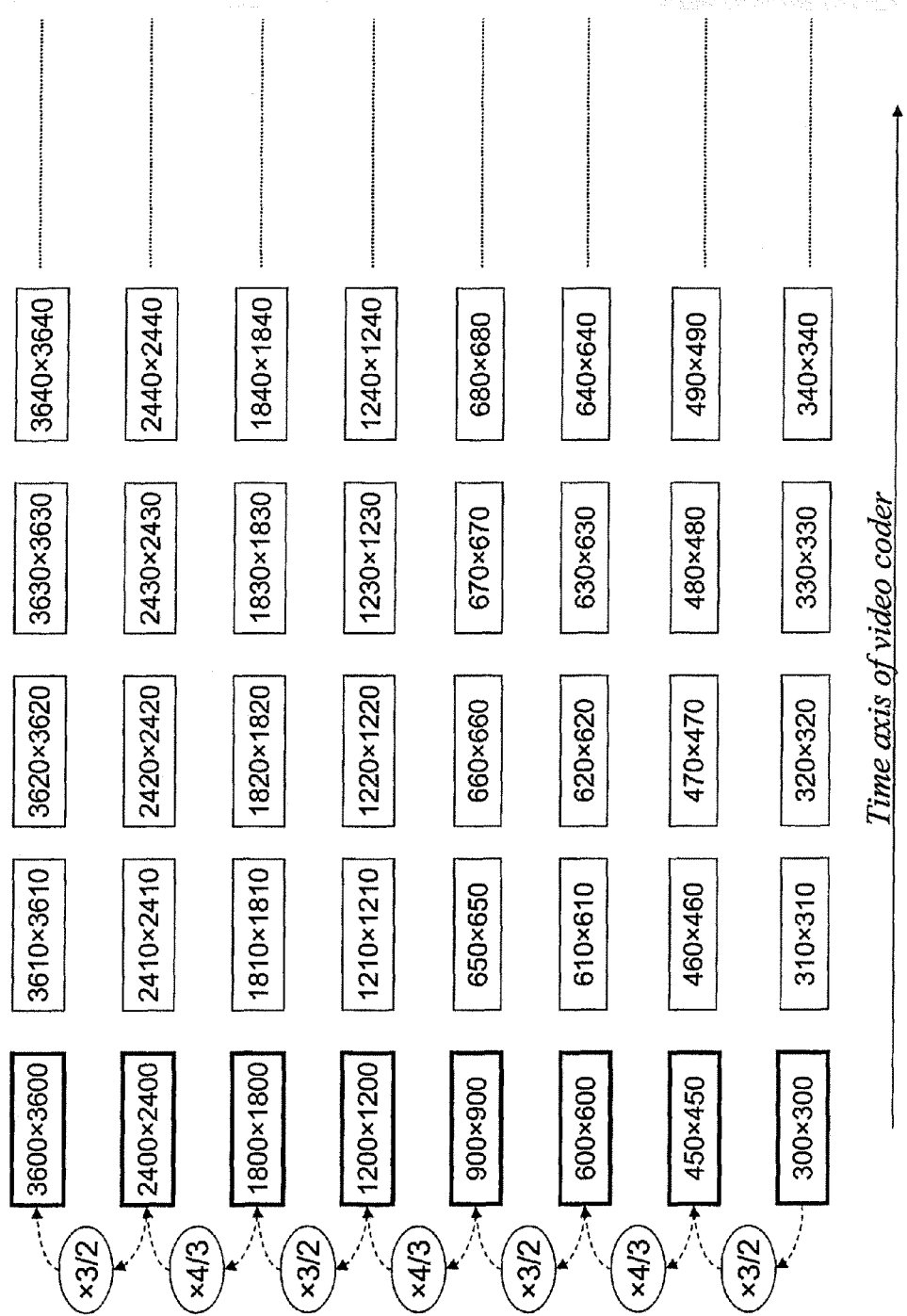
FIG. 9 illustrates a practical example of the variant in FIG. 8.

FIGS. 8 and 9 illustrate another variant embodiment of the invention that involves the SVC standard (an acronym signifying in English terminology "Scalable Video Coding") currently being drawn up and which constitutes an extension of the H.264/AVC standard to hierarchical video coding (known in English terminology by the term "Scalable").

According to the SVC standard ("Joint Draft 6", Joint Video Team (JVT) of ISO/IEC MPEG & ITU-T VCEG, 19th JVT Meeting, Geneva, Switzerland, April 2006) a coding of a video sequence is performed in a way compatible with the non-hierarchical standard H.264/AVC at a base spatial resolution level.

Spatial improvement layers can also be coded on top of the base layer in order to provide a progressive compressed representation in terms of spatial resolution of the video sequence.

It should be noted that the spatial granularity offered by the SVC standard is however limited, as well as the geometric ratios between the various layers (base and improvement layers).

The variant illustrated in FIG. 8 combines the multi-resolution spatial coding disclosed above with the spatial hierarchy of the SVC standard.

Thus, within each SVC spatial layer, versions are coded at successive spatial resolution levels of the fixed image in question.

FIG. 8 illustrates such an organization of the compressed bitstream and shows a base layer as well as two spatial improvement layers coded on top of it.

Thus there is obtained, for each SVC spatial layer, a very fine spatial granularity when the decoding takes place within said layer, along the time axis, which is here used as a supplementary spatial resolution axis.

In addition, this variant can make it possible to rapidly access the spatial resolution level of the compressed bitstream required by the user.

To do this, a decoding path is used passing first through the spatial hierarchy layers of the SVC standard, then along the time axis, in order to achieve precisely the spatial resolution level required by the user.

By way of example, in order to achieve the resolution level of the image EB situated on the first spatial improvement layer in FIG. 8 (the second image on the second line in this figure), if the prediction between spatial layers is deactivated for the images other than the first image, it is only necessary to decode the image I situated on the base layer, as well as the images EI and EP situated on the first improvement layer (first and second images on the second line in this figure), in order to achieve the image EB in question.

By virtue of this variant, it is thus possible to rapidly access a resolution level situated on a spatial improvement layer without needing to decode the entire base layer, as well as all the images in the spatial improvement layers preceding the one where the image with the required resolution is situated.

This is because, if the plurality of images depicted in FIG. 5 are considered (where the hierarchical video coding of this plurality of images has not been performed in accordance with the SVC standard), in order to display the image 266 in this sequence of images, it is necessary to decode all the previous images from the image with the lowest resolution 250.

FIG. 9 illustrates in a practical fashion an example of the combination of the spatial hierarchy of the SVC standard with the present invention.

In this figure there appears a base layer situated at the bottom and a plurality of spatial improvement layers situated above it with, indicated on the left, the spatial scale factors between the various spatial hierarchy layers.

This figure thus illustrates examples of image dimensions that it is possible to obtain rapidly by virtue of this variant.

It should also be noted that, according to this variant, it is possible to obtain a larger number of spatial improvement layers than in the SVC standard and that the geometric ratios or scale factors between two layers can be selected more freely than in the SVC standard.

The invention claimed is:

1. A method of coding digital images, wherein the method comprises a step of video coding using one or more processors, of a plurality of temporally successive images, said video coding using temporal prediction tools implementing a prediction step based on motion compensation between various resolution levels of the same image, the plurality of successive images corresponding to a plurality of versions of one and the same initial image at spatial resolutions different from that of the initial image, and wherein the method further comprises a prior step of obtaining the plurality of successive images from the initial image.

2. The method according to claim 1, wherein the spatial resolutions are ordered.

3. The method according to claim 1, wherein the spatial resolutions are lower than that of the initial image.

4. The method according to claim 1, wherein, the initial image having an initial spatial size, prior to the step of video coding the method comprises a step of increasing the edges of each of the images in the plurality of successive images, these so called useful images having a size less than that of the maximum size image obtained from this plurality of images, each image with its size thus increased having the same spatial size as that of the maximum size image.

5. The method according to claim 4, wherein it comprises a step of inserting header data in the signal comprising the plurality of coded images, the header data comprising, for each image of increased size, the size of the useful image.

6. The method according to claim 5, wherein the header data comprise, for each image of increased size, the position of the useful image in the image of increased size.

7. The method according to claim 1, wherein it comprises a step of inserting header data in the signal comprising the plurality of coded images, the header data comprising the size of the lowest resolution image and the number of resolution levels contained in the signal.

8. The method according to claim 1, wherein the obtaining step comprise a step of subsampling the initial image.

9. The method according to claim 8, wherein the obtaining step also comprises a step of filtering the subsampled images.

10. The method according to claim 1, wherein video coding of the plurality of images at successive resolutions lower than that of the initial image comprises a step of video coding of the lowest resolution image as for an INTRA image of a video sequence.

11. The method according to claim 10, wherein the video coding also comprises, for at least some of the successive images with resolutions higher than that of the lowest resolution image, a step of predictive video coding of each of these images.

12. The method according to claim 1, wherein it comprises a step of coding at least one permutation image and a step of inserting said at least one coded permutation image among the plurality of successive coded images.

13. The method according to claim 1, wherein it also comprises a step of hierarchical video coding of the plurality of successive images.

14. A non-transitory computer-readable storage medium storing a computer program, said computer program containing instructions for implementing the coding method according to claim 1 when the program is loaded into and executed by a computer system.

15. A method of decoding at least some of a plurality of temporally successive digital images coded by video coding, said video coding using prediction tools implementing a prediction step based on motion compensation between various resolution levels of the same image, wherein the plurality of successive images correspond to a plurality of versions of one and the same initial image at spatial resolutions different from that of the initial image, the method comprising a step of video decoding, using one or more processors, of at least some of the plurality of coded images, and wherein the method further comprises a prior step of obtaining the plurality of successive images from the initial image.

16. The method according to claim 15, wherein the method comprises the following steps:
    determining, among the plurality of coded successive images, a coded image having a resolution corresponding to a spatial size selected by a user,
    video decoding of the coded successive images from the lowest resolution coded image as far as the coded image thus determined.

17. The method according to claim 15, wherein the spatial resolutions are ordered.

18. The method according to claim 15, wherein the spatial resolutions are lower than that of the initial image.

19. The method according to claim 15, wherein it comprises a step of reading header data of the signal comprising the plurality of coded images, the header data comprising the size of the lowest resolution image and the number of resolution levels contained in the signal.

20. The method according to claim 15, wherein each of the coded images is an image whose size has been increased with respect to the smallest size of the useful image in order to attain, for each image, the maximum size of the image obtained from the plurality of successive images, the method comprising a step of reading header data of the signal comprising the plurality of coded images, the header data comprising, for each coded image, the size of the useful image.

21. The method according to claim 20, wherein the header data comprise, for each coded image, the position of the useful image in the image of increased size.

22. The method according to claim 15, wherein, the plurality of successive images also having undergone hierarchical video coding, the method comprises a step of hierarchical video decoding of at least some of the plurality of successive images thus coded.

23. A non-transitory computer-readable storage medium storing a computer program, said computer program containing instructions for implementing the decoding method according to claim 15, when the program is loaded into and executed by a computer system.

24. A device for coding digital images, wherein the device comprises means of video coding of a plurality of temporally successive images, said video coding using temporal prediction tools implementing a prediction step based on motion compensation between various resolution levels of the same image, the plurality of successive images corresponding to a plurality of versions of one and the same initial image at spatial resolutions different from that of the initial image, wherein the plurality of successive images are prior obtained, from the initial image.

25. A device for decoding at least some of a plurality of temporally successive digital images coded by video coding, said video coding using temporal prediction tools implementing a prediction step based on motion compensation between various resolution levels of the same image, wherein the plurality of successive images correspond to a plurality of versions of one and the same initial image at spatial resolutions different from that of the initial image, the device comprising means of video decoding of at least some of this plurality of coded images, wherein the plurality of successive images are prior obtained, from the initial image.

* * * * *